United States Patent [19]
Plenge

[11] Patent Number: 6,084,962
[45] Date of Patent: Jul. 4, 2000

[54] DISPLAY WINDOW FOR A HANDSET

[75] Inventor: Gert Plenge, Oelstykke, Denmark

[73] Assignee: Nokia Mobile Phone, Ltd., Espoo, Finland

[21] Appl. No.: 09/024,598

[22] Filed: Feb. 17, 1998

[30] Foreign Application Priority Data

Feb. 21, 1997 [GB] United Kingdom .................... 9703653

[51] Int. Cl.[7] ................................................. H04M 1/00
[52] U.S. Cl. ............................................................ 379/433
[58] Field of Search .................................... 379/433, 434, 379/428; 455/575, 90

[56] References Cited

U.S. PATENT DOCUMENTS

| 4,945,633 | 8/1990 | Hakanen et al. ......................... 29/825 |
| 5,036,432 | 7/1991 | Uronen et al. .......................... 361/422 |
| 5,045,973 | 9/1991 | Saarela et al. .......................... 361/395 |
| 5,768,370 | 6/1998 | Maatta et al. ........................... 379/433 |

OTHER PUBLICATIONS

Patent Abstracts of Japan, Publication No. 08274851 A, Oct. 18, 1996, "Portable Telephone System".

*Primary Examiner*—Jack Chiang
*Attorney, Agent, or Firm*—Perman & Green, LLP

[57] ABSTRACT

A display window for a housing component, the display window and housing component together providing the front face of a radio telephone configured such that when face downwards on a generally planar surface there is contact between the display window and the surface. The display window has a transparent portion through which the display region of a radio telephone is visible and being provided with one or more projections arranged such that on placement of the handset face downwards on a generally planar surface, contact is made between the one or more projections and the planar surface to protect the transparent display window from contact with the surface.

13 Claims, 3 Drawing Sheets

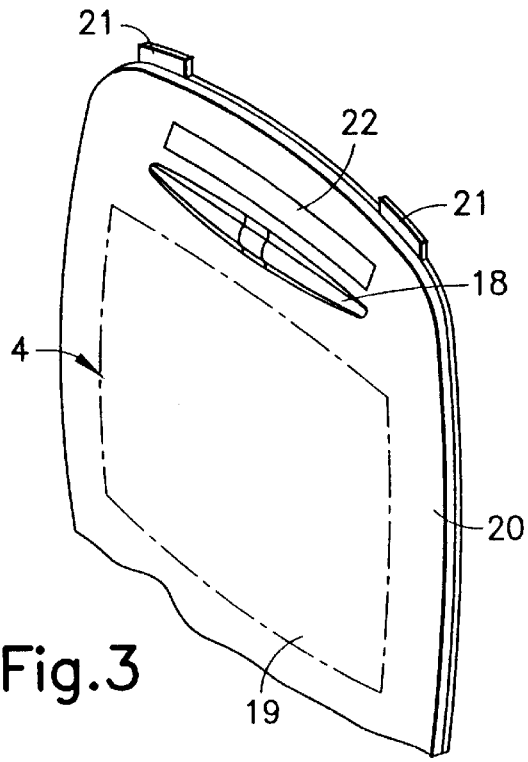
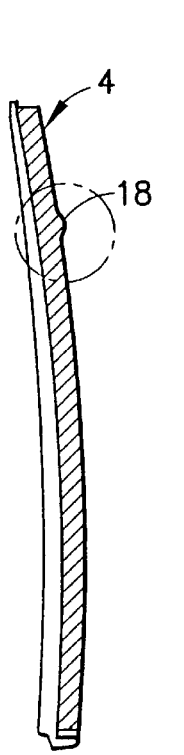
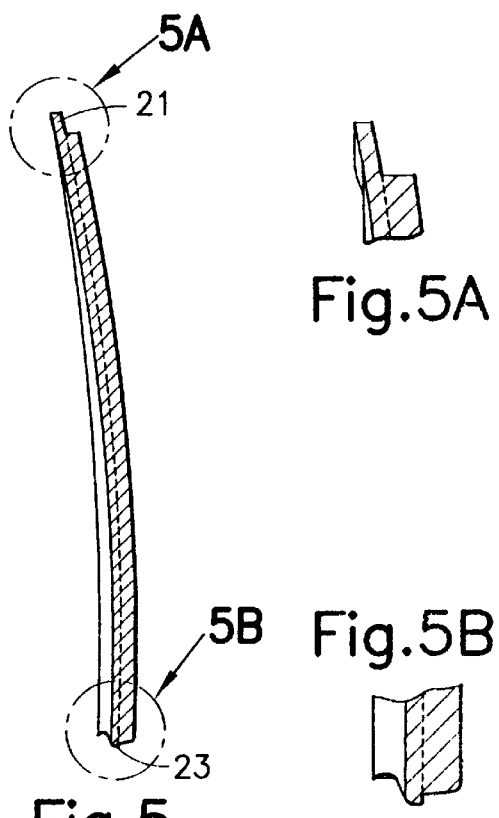

DISPLAY WINDOW FOR A HANDSET

BACKGROUND OF THE INVENTION

The invention relates to a display window for a radio telephone or other handset.

A radio telephone typically has a Liquid Crystal Display (LCD) for displaying telephone numbers, instructions and other information useful for the user to view during operation of the telephone. The LCD is protected by a display window that has a transparent portion so that the items displayed on the LCD can be easily viewed by the user.

The display windows of radio telephones are vulnerable to scratching. Any scratches that appear on the window detract from its appearance. They can also interfere with the user's ability to read clearly the instructions he or she is to follow.

The design of the handset has some impact on the likelihood that the display window will become scratched. A handset is most likely to be scratched if is placed display side down on an abrasive surface. If the handset is designed in such a way as to put the display window in contact with the surface when placed in this position, it is likely that the window will become scratched.

The window displays of phones such as the Nokia 8110, that have a generally concave front profile, are at least partially protected from scratching. This is because, when placed face down on a surface, the top and bottom extremes of the handset support the phone so that the display window is kept out of contact with potentially abrasive surfaces and is, accordingly, less likely to become scratched.

SUMMARY OF THE INVENTION

In accordance with a first aspect of the present invention there is provided a display window for a housing component, the display window and housing component together providing the front face of a handset configured such that when face downwards on a generally planar surface there is contact between the display window and the surface, the display window having a transparent portion through which the display region of a handset is visible and being provided with one or more projections arranged such that on placement of the handset face downwards on a generally planar surface, contact is made between the one or more projections and the planar surface and the transparent display window is maintained spaced from the surface.

In accordance with a second aspect of the present invention there is provided a housing component for a radio handset, the housing component providing the front face of a handset and including a display window having a transparent portion through which the display region of a handset is visible, the front face being shaped such that when face downwards on a generally planar surface, there is contact between the display window and the surface, the display window being provided with one or more projections such that when the housing component is supported face downwards on a generally planar surface, contact is made between the one or more projections and the planar surface and the transparent display window is maintained spaced from the surface.

The invention allows a handset to be placed face down on a surface while still avoiding contact with the transparent portion of the display window. This reduces the chance of the window being scratched and improves the life cycle of the display window. Scratches on the one or more projections are less visible and do not affect the clarity of the display and can, therefore, be tolerated.

The invention is of particular utility for handsets of the type in which the key pad that allows user input to the radio handset processor is positioned in a recess. In particular those for which the upper and lower extents of the recess are defined by a raised 'chin' region at the bottom and the display window. Some such handsets have a somewhat shallow S-shaped profile with the key pad being in a slight recess and the display window being somewhat convex. The same advantage can be obtained for handsets in which the key pad is located in a recess but in which the display window is substantially planar.

The display window is preferably removably attachable to the housing so as to allow replacement of an existing scratched display window or to allow a user to customise his or her own handset. The housing may be the front cover of a radio telephone.

For aesthetic reasons the one or more projections may comprise a single elongate element extending across the display window. This projection can be positioned so as to highlight textual or graphic information presented on the display window. For example the projection could be used to underscore a brand name printed on the display window. The elongate projection may be arranged such that it acts as a magnifier for text which it overlies.

Preferably the display window is formed as an integral component and from plastics material.

BRIEF DESCRIPTION OF THE DRAWINGS

The invention will be described in more detail, by way of example, with reference to the accompanying drawings of which:

FIG. 3 is a perspective view of a display window of the handset of FIG. 1;

FIG. 4 is a section through the display window of FIG. 3 through the elongate projection;

FIG. 5 is a section through the display window of FIG. 4 showing connections for assembly;

FIGS. 5A and 5B are detail cross sectional views, enlargements of circled regions 5A and 5B, respectively, illustrated in FIG. 5.

DETAILED DESCRIPTION OF THE INVENTION

Figure 1:
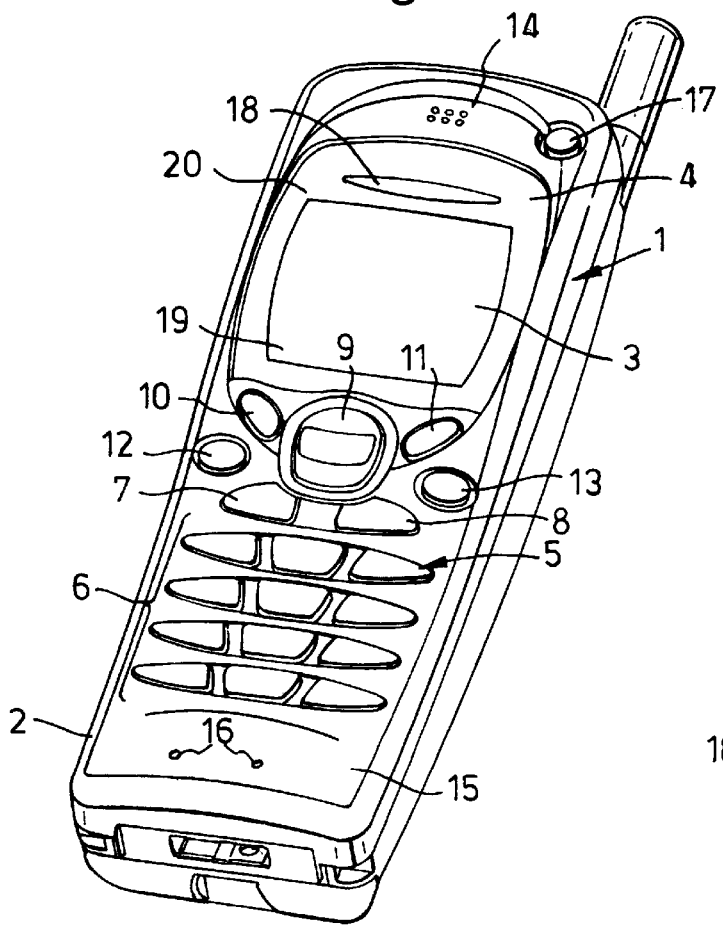
FIG. 1 is a perspective view of a radio handset.
Figure 2:
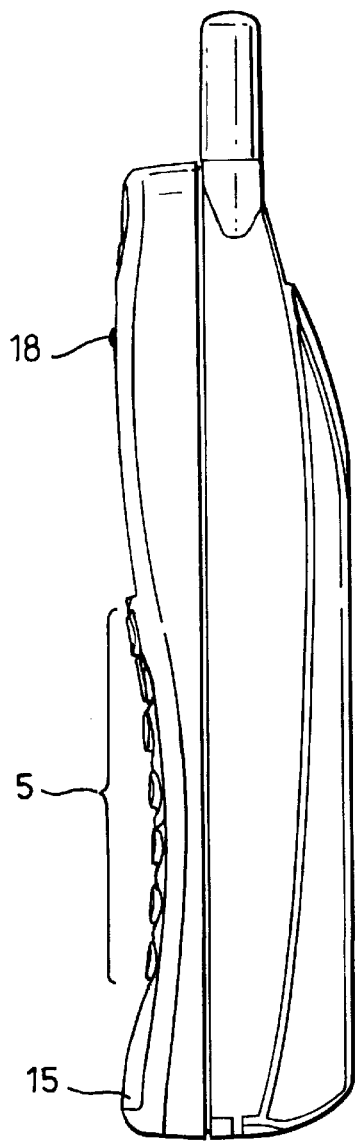
FIG. 2 is a side view of the handset of FIG. 1.

A handset 1 in accordance with an embodiment of this invention shown in FIGS. 1 and 2 comprises a housing 2 enclosing substantially the whole of the electronic circuitry for operation of the handset 1. Information is displayed on a Liquid Crystal Display (LCD) 3 located behind a display window 4.

Included on the handset is a key pad 5 which comprises a first group of keys or buttons 6 labelled 0–9, * and # arranged in an array of three columns and four rows, as is usual. The numeric digits 0,1, . . . 9 and the characters "*" and "#" are for dialling telephone numbers, but can also be used for entering alphanumeric data into the telephone number store. A second group of control keys or buttons for selecting various functions such as a call start key (eg labelled SEND) 7 a call terminate key 8 (eg labelled END), a scroll key 9, first 10 and second 11 soft keys that have a different associated function dependent upon the operating state of the radio telephone, a clear key 12, and a alphanumeric key 13 that toggles the input from the first group of keys between digits and alpha keys. The display window 4 is located on the housing 2 above the two groups of keys. Above the display window 4 is a series of holes 14 behind which is an earphone or speaker for transmitting speech or other sounds to the user of the radio telephone.

At its other extreme, the housing 2 has a raised 'chin' region 15 including a pair of holes 16 behind which is mounted a microphone. The power is controlled by power key 17. From the side profile shown in FIG. 2, it can be seen that the key pad 5 is located in a recess that protects the keys from actuation when the handset is placed face downwards. The curvature of the display window 4 can also be seen. From this view it can be understood that when the handset is placed display downwards on a generally planar surface, the handset will rest on the raised chin 15 and on an elongate projection 18 located on the display window 4. It is not essential that the projection is elongate but this does have advantages. Both the raised chin and the elongate projection extend sufficiently in a direction transverse to the longitudinal axis of the handset to provide a stable resting position for the handset when face down on a surface. A projection that did not extend transverse to the longitudinal axis of the handset would protect the transparent window to an extent but would not provide the same stability. The precise configuration of an elongate projection is not critical, any configuration that provided lateral stability would have the same advantages. The same advantages could also be achieved by a suitable array of projections.

The display window has a transparent region 19 that coincides with the LCD display 3 and a border region 20 that is preferably coloured to give visual prominence to the display region. The elongate projection is located in the border region so as not to distort the display viewed through the transparent region 19. It can be seen in section in FIG. 4.

The shape of the display window 4 can be seen in greater detail in FIG. 3. The window 4 has protrusions 21, for attachment to the housing 2 and a display region 22 on which the brand name of the handset can be displayed. In this position, the brand name is underscored by the elongate projection giving it extra prominence. The elongate projection acts as a lens to magnify the border region it underlies.

The elongate protrusion is preferably an integral part of the display window and may be formed from transparent plastics material by injection moulding. Other materials and processes are however envisaged for fabrication of the display window. The border region 20 and any text or graphic information could be formed by printing on the rear side of the display window or in another way such as cubic printing.

Figure 6:
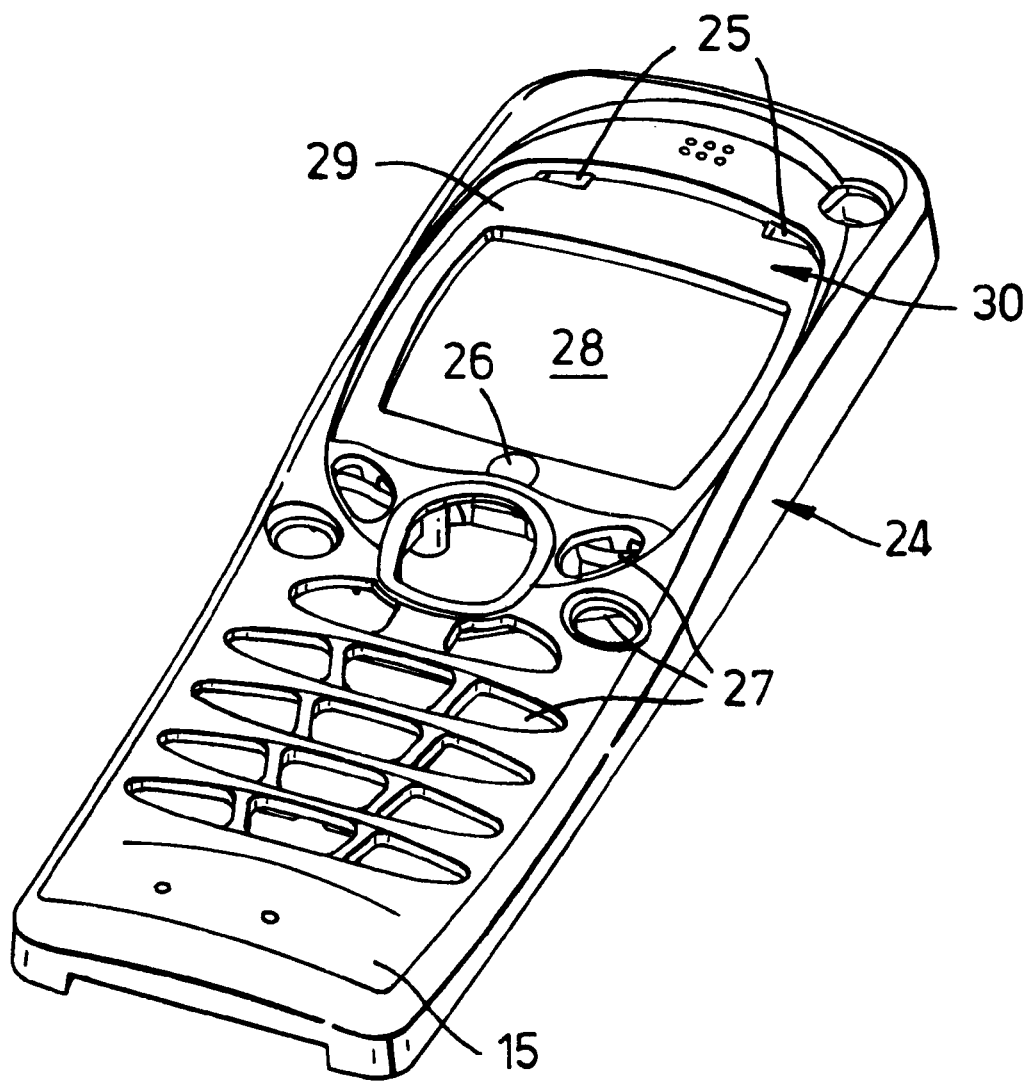
FIG. 6 is a perspective view of an A-cover for the radio handset of FIG. 1.

FIG. 5 shows the protrusions 21 in section, and a tab 23 located on the lower edge of the display window for attachment to the housing. The A-cover 24 of the housing 2 can be seen in greater detail in FIG. 6. The A-cover includes recesses 25 to receive projections 21 and a recess 26 to receive the lower tab 23. It has apertures 27 through which the keys of a key pad project in the assembled handset and a display aperture 28 behind which the LCD lies in the assembled handset. The A-cover is provided with a recess 30 in which the display window rests. The recess 30 has a flat flange region 29 defining the display aperture 4 for supporting the display and allowing an adhesive to be used to secure the display window in position if desirable.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A display window for a housing component, the display window and housing component together providing the front face of a radio handset, the display window having a transparent portion through which the display region of a handset is visible and being provided with one or more projections arranged such that on placement of the handset face downwards on a generally planar surface, contact is made between the one or more projections and the planar surface and the transparent display window is maintained spaced from the surface.

2. A display window according to claim 1 wherein the front face of the display window is convex.

3. A display window according to claim 1 wherein the one or more projections comprises an elongate element extending across the display window.

4. A display window according to claim 1 wherein the one or more projections is formed as an integral part of the display window.

5. A display window according to claim 1 wherein the projection is arranged so as to accentuate textual or graphic information provided thereon.

6. A display window according to claim 1 wherein the projection acts as a magnifying lens for any underlying indicia.

7. A display window according to claim 1 wherein the display window is an integral component formed from a plastics material.

8. A housing component for a radio handset, the housing component providing the front face of a handset and including a display window having a transparent portion through which the display region of a handset is visible, the display window being provided with one or more projections such that when the housing component is supported face downwards on a generally planar surface, contact is made between the one or more projections and the planar surface and the transparent display window is maintained spaced from the surface.

9. A housing component according to claim 8 wherein the display window is removably attachable to the front cover.

10. A housing component according to claim 8 wherein the front face of the radio handset provides a concave region in which the key pad for user communication with the processor of the radio handset is located.

11. A housing component according to claim 10 wherein the side profile of the housing component is convex in the locality of the display window and concave in the locality of the key pad.

12. A housing component according to claim 10 wherein the housing component comprises a raised region proximate the key pad on the side remote from the display window for providing contact with a generally planar surface such that the keys of the key pad are maintained at a distance from the surface when placed face down thereon.

13. A housing component according to claim 8 wherein the housing component is a radio handset front cover.

* * * * *